United States Patent
Lee et al.

(10) Patent No.: US 8,194,989 B2
(45) Date of Patent: Jun. 5, 2012

(54) METHOD AND APPARATUS FOR ENCODING AND DECODING IMAGE USING MODIFICATION OF RESIDUAL BLOCK

(75) Inventors: Jae-chool Lee, Suwon-si (KR); Woo-jin Han, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1146 days.

(21) Appl. No.: 12/032,056

(22) Filed: Feb. 15, 2008

(65) Prior Publication Data

US 2008/0247658 A1 Oct. 9, 2008

(30) Foreign Application Priority Data

Apr. 6, 2007 (KR) .................. 10-2007-0034418

(51) Int. Cl.
*G06K 9/36* (2006.01)
(52) U.S. Cl. ............................... 382/239; 382/238
(58) Field of Classification Search .......... 382/232–253; 348/240–241
See application file for complete search history.

(56) References Cited

U.S. PATENT DOCUMENTS

| | | | | |
|---|---|---|---|---|
| 5,990,956 A * | 11/1999 | Lee | ............... | 348/404.1 |
| 6,035,070 A * | 3/2000 | Moon et al. | .................. | 382/243 |
| 6,078,694 A * | 6/2000 | Takahashi et al. | ............ | 382/238 |
| 6,081,551 A | 6/2000 | Etoh | | |
| 6,173,077 B1 * | 1/2001 | Trew et al. | .................... | 382/236 |
| 6,233,279 B1 * | 5/2001 | Boon | ....................... | 375/240.08 |
| 6,256,417 B1 * | 7/2001 | Takahashi et al. | ............ | 382/232 |
| 6,591,018 B2 * | 7/2003 | Okuno et al. | .................. | 382/243 |
| 6,600,786 B1 * | 7/2003 | Prakash et al. | ........... | 375/240.25 |
| 6,687,405 B1 * | 2/2004 | Trew et al. | .................... | 382/232 |
| 7,216,140 B1 * | 5/2007 | Chen et al. | .................... | 708/607 |
| 2003/0202592 A1 | 10/2003 | Sohn et al. | | |
| 2004/0042673 A1 * | 3/2004 | Boon | ......................... | 382/239 |
| 2006/0088096 A1 | 4/2006 | Han et al. | | |
| 2008/0225947 A1 * | 9/2008 | Narroschke et al. | ..... | 375/240.12 |

FOREIGN PATENT DOCUMENTS

| | | |
|---|---|---|
| EP | 1761069 A1 | 3/2007 |
| GB | 2320989 A | 7/1998 |
| JP | 09-214979 A | 8/1997 |
| JP | 2001-292451 A | 10/2001 |

OTHER PUBLICATIONS

Wien, M. "Variable Block-Size Transforms for H.264/AVC", IEEE Transactions on Circuits and Systems for Video Technology, vol. 13, No. 7, Jul. 2003, pp. 604-613.
Extended European Search Report issued on Feb. 4, 2011 in the corresponding European Patent Application No. 08712533.2.

* cited by examiner

*Primary Examiner* — Jingge Wu
*Assistant Examiner* — Sean Motsinger
(74) *Attorney, Agent, or Firm* — Sughrue Mion, PLLC (57) ABSTRACT

Provided are a method and apparatus for encoding and decoding an image. In the encoding method, a residual block of a current block is transformed using a predicted block of the current block so as to increase the spatial correlation among residual values, and DCT is performed on the transformed residual block, thus improving the efficiency of transforming a block having a region that is difficult to precisely predict.

19 Claims, 7 Drawing Sheets

| 105 | 109 | 116 | 101 |
| 106 | 110 | 112 | 84 |
| 118 | 100 | 79 | 99 |
| 78 | 79 | 99 | 171 |

FIG. 4B

| 0 | 0 | 0 | 1 |
| 0 | 0 | 1 | 1 |
| 1 | 1 | 1 | 1 |
| 1 | 1 | 1 | 1 |

FIG. 4C

| 1 | 1 | 1 | 1 |
| 1 | 1 | 1 | 1 |
| 1 | 1 | 0 | 0 |
| 1 | 0 | 0 | 0 |

FIG. 5A

| 1 | -2 | -4 | -1 |
|---|---|---|---|
| 0 | 0 | -2 | -7 |
| -5 | 12 | -8 | -4 |
| -14 | -19 | 3 | 11 |

| 0 | 0 | 0 | -1 |
|---|---|---|---|
| 0 | 0 | -2 | -7 |
| -5 | 12 | -8 | -4 |
| -14 | -19 | 3 | 11 |

| -5 | 12 | -2 | -1 |
|---|---|---|---|
| -14 | -19 | -8 | -7 |
| 3 | -4 | 0 | 0 |
| 11 | 0 | 0 | 0 |

| -1 | 0 | 0 | 0 |
|---|---|---|---|
| 0 | 1 | -1 | -1 |
| 1 | 0 | 0 | 0 |
| 0 | 0 | 0 | 0 |

METHOD AND APPARATUS FOR ENCODING AND DECODING IMAGE USING MODIFICATION OF RESIDUAL BLOCK

CROSS-REFERENCE TO RELATED PATENT APPLICATIONS

This application claims the benefit of Korean Patent Application No. 10-2007-0034418, filed on Apr. 6, 2007, in the Korean Intellectual Property Office, the disclosure of which is incorporated herein in its entirety by reference.

BACKGROUND OF THE INVENTION

1. Field of the Invention

Apparatuses and methods consistent with the present invention relate to encoding and decoding an image, and more particularly, to encoding and decoding a block that contains regions, such as an edge or a texture, that is difficult to precisely predict, thus reducing the compression efficiency of encoding, thereby ensuring high compression efficiency.

2. Description of the Related Art

In video compression methods, such as Motion Pictures Expert Group (MPEG)-1, MPEG-2, and H.264/MPEG-4 Advanced Video Coding (AVC), a picture is divided into a plurality of macro blocks in order to encode an image. Then, each of the macro blocks is prediction encoded by performing inter prediction or intra prediction thereon. Specifically, a predicted block of a current block that is to be encoded is produced using inter prediction or intra prediction, only a residual block obtained by subtracting the predicted block from the current block is encoded, and the encoded residual block is transmitted. That is, the values of pixels included in the current block are not directly encoded; instead, the result of subtracting the value of each pixel of the predicted block from the value of the corresponding pixel of the current block is encoded, thereby improving the compression efficiency of encoding, as will now be described in detail with reference to FIG. 1.

Figure 1:
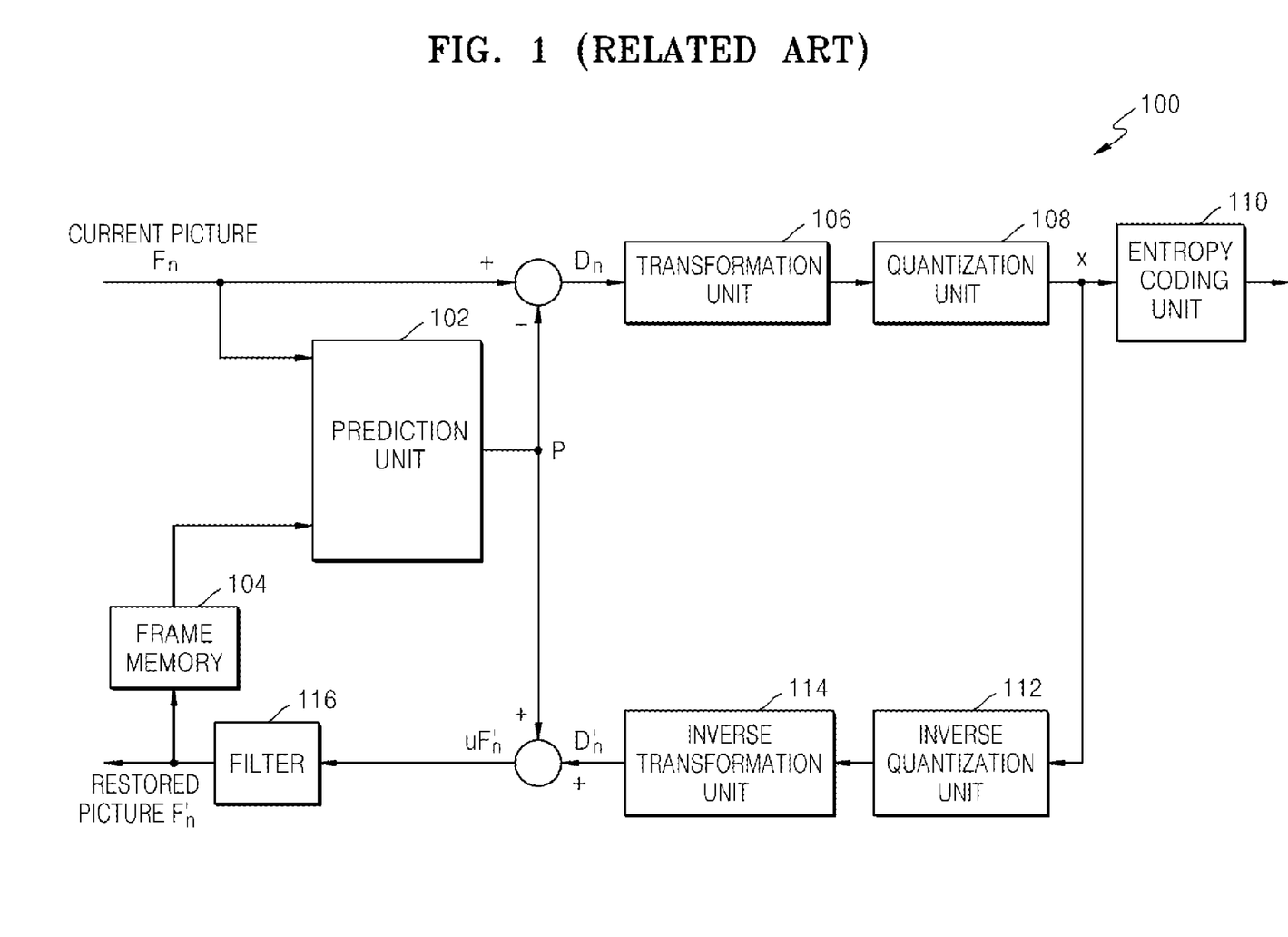
FIG. 1 is a block diagram of a related art image encoding apparatus.

FIG. 1 is a block diagram of a related art image encoding apparatus 100. The encoding apparatus 100 includes a prediction unit 102, a frame memory 104, a transformation unit 106, a quantization unit 108, an entropy encoding unit 110, an inverse quantization unit 112, an inverse transformation unit 114, and a filter 116.

The prediction unit 102 performs inter prediction or intra prediction so as to produce a predicted block of a current block that is to be encoded. In the case of inter prediction, a block similar to the current block is searched for from among one or more reference pictures stored in the frame memory 104. The searched block is used as a predicted block of the current block. In the case of intra prediction, intra directional prediction is performed using pixels of previously encoded blocks adjacent to a current block so as to produce a predicted block of the current block.

A residual block is obtained by subtracting the predicted block from the current block, and is orthogonally transformed into the frequency domain by the transformation unit 106. The transformation unit 106 orthogonally transforms the residual block into the frequency domain by producing discrete cosine transform (DCT) coefficients by performing DCT on a residual value of each pixel of the residual block.

The quantization unit 108 quantizes the DCT coefficients received from the transformation unit 106 by using a predetermined quantization coefficient Qp. The entropy encoding unit 110 entropy encodes the quantized DCT coefficients and inserts the encoded result into a bitstream.

Also, the quantized DCT coefficients are inversely quantized by the inverse quantization unit 112, and restored to the residual block by the inverse transformation unit 114. The restored residual block is added to the predicted block produced by the prediction unit 102.

The resultant block is deblocking filtered by the filter 116, and stored in the frame memory 104 so that it can be used to perform inter prediction or intra prediction on a subsequent block.

As described above with reference to FIG. 1, a predicted block of a current block must be as similar as possible to the current block in order to prediction encode the current block with high compression efficiency, using a related art image encoding apparatus. However, if the current block contains pixels of an edge region or a text region, it is difficult to precisely perform prediction on the current block.

Accordingly, there is a need for development of a method and apparatus for encoding and decoding even an image block, which is difficult to precisely predict, with high compression efficiency.

SUMMARY OF THE INVENTION

The present invention provides a method and apparatus for encoding and decoding an image with high compression efficiency by transforming a residual block so that the spatial correlation among pixels of the residual block can be increased, and performing DCT on the transformed block.

The present invention also provides a computer readable medium having recorded thereon a program for executing the above method.

According to an aspect of the present invention, there is provided a method of encoding an image, the method including generating a predicted block of a current block, and subtracting the predicted block from the current block in order to generate a residual block of the current block; generating information for increasing a spatial correlation among values of residuals included in the residual block based on the predicted block, and transforming the residual block based on the information; and performing DCT on a part of the transformed residual block based on the information.

The performing of the DCT may include performing shape-adaptive DCT on the transformed residual block.

The generating of the information and transforming of the residual block may include generating a gradient map of the predicted block; selecting residual values on which DCT is to be performed, from among the residual values of the residual block, based on the gradient map; and shifting the selected residual values to the top and the left side of the residual block.

The method may further include performing entropy encoding only on coefficients obtained by performing shape-adaptive DCT, according to the gradient map.

According to another aspect of the present invention, there is provided an apparatus for encoding an image, the apparatus including a prediction unit generating a predicted block of a current block; a subtraction unit generating a residual block of the current block by subtracting the predicted block from the current block; a pre-processor generating information for increasing the spatial correlation among values of residuals included in the residual block based on the predicted block, and transforming the residual block based on the information; and a transformation unit performing DCT) on a part of the transformed residual block based on the information.

The transformation unit may perform shape-adaptive DCT on the transformed residual block.

The apparatus may further include an entropy encoding unit performing entropy encoding on only coefficients obtained by performing shape-adaptive DCT, according to the gradient map.

According to another aspect of the present invention, there is provided a method of decoding an image, the method including generating a predicted block of a current block, and information for increasing the spatial correlation among values of residuals included in a residual block of the current block based on the predicted block; performing inverse DCT on a part of DCT coefficients of the residual block, using the information; rearranging the residual values of the residual block which are obtained by performing inverse DCT, using the information; and combining the rearranged residual block and the predicted block so as to restore the current block.

The generating of the predicted block and the information may include generating a gradient map of the predicted block.

According to another aspect of the present invention, there is provided an apparatus for decoding an image, the apparatus including a prediction unit generating a predicted block of a current block; a pre-processor generating information for increasing a spatial correlation among values of residuals included in a residual block of the current block, based on the predicted block; an inverse transformation unit performing inverse DCT on a part of DCT coefficients of the residual block, using the information; and an addition unit rearranging the residual values of the residual block which are obtained by performing inverse DCT by using the information, and combining the rearranged residual block and the predicted block so as to restore the current block.

The pre-processor may generate a gradient map of the predicted block.

According to another aspect of the present invention, there is provided a computer readable medium having recorded thereon a program for executing the above methods of encoding and decoding an image.

BRIEF DESCRIPTION OF THE DRAWINGS

The above and other features of the present invention will become more apparent by describing in detail exemplary embodiments thereof with reference to the attached drawings in which.

DETAILED DESCRIPTION OF THE INVENTION

Hereinafter, exemplary embodiments of the present invention will be described with reference to the accompanying drawings.

Figure 2:
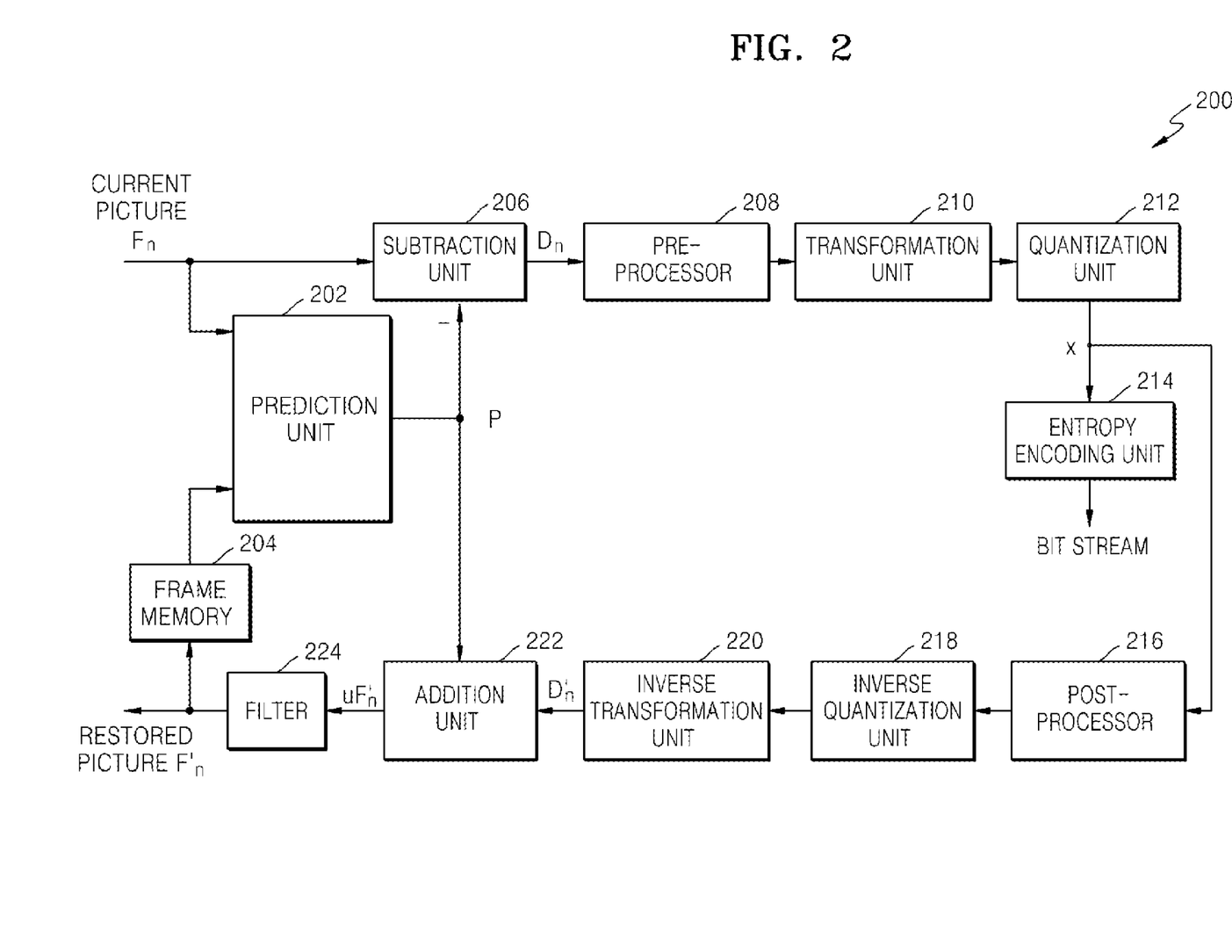
FIG. 2 is a block diagram of an image encoding apparatus according to an exemplary embodiment of the present invention.

FIG. 2 is a block diagram of an apparatus 200 that encodes an image, according to an exemplary embodiment of the present invention. Referring to FIG. 2, the encoding apparatus 200 includes a prediction unit 202, a frame memory 204, a subtraction unit 206, a pre-processor 208, a transformation unit 210, a quantization unit 212, an entropy encoding unit 214, a post-processor 216, an inverse quantization unit 218, an inverse transformation unit 220, an addition unit 222, and a filter 224. Here, the pre-processor 208, the transformation unit 210, and the entropy encoding unit 214 correspond to an image encoding apparatus according to the present invention.

The prediction unit 202 produces a predicted block of a current block by performing inter prediction or intra prediction on the current block. For example, inter prediction is performed on the current block by using reference pictures stored in the frame memory 204, and intra prediction is performed using pixels of a previously encoded region adjacent to the current block, which are stored in the frame memory 204.

The subtraction unit 206 produces a residual block by subtracting the predicted block from the current block. That is, the predicted block obtained by the prediction unit 202 performing inter prediction or intra prediction is subtracted from the current block.

The pre-processor 208 produces information for increasing the spatial correlation among the values of residuals of the residual block generated by the subtraction unit 206, based on the predicted block, and then transforms the residual block based on the information.

That is, a gradient map of the predicted block is produced, the values of residuals included in a region having similar gradient values are selected, and then, the residual block is transformed using the selected values, thereby increasing the spatial correlation among the values of residuals of the residual block.

Figure 3:
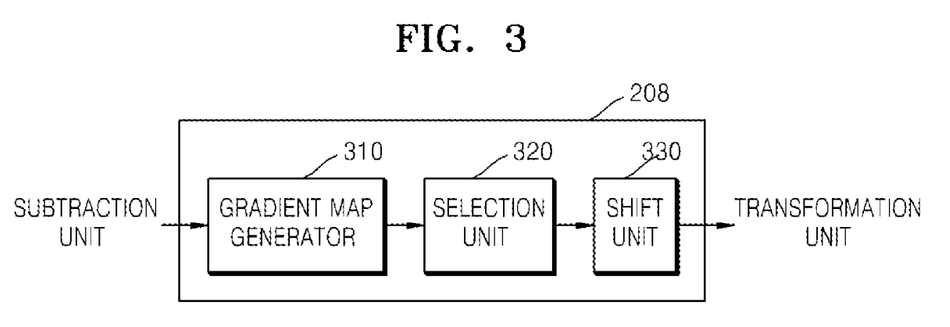
FIG. 3 is a block diagram of a pre-processor illustrated in FIG. 2, according to an exemplary embodiment of the present invention.

FIG. 3 is a block diagram of the pre-processor 208 illustrated in FIG. 2, according to an embodiment of the present invention. Referring to FIG. 3, the pre-processor 208 includes a gradient map generator 310, a selection unit 320, and a shift unit 330. The pre-processor 208 generates a gradient map of a predicted block as information for increasing the spatial correlation among the values of residuals of a residual block, and transforms the residual block using the gradient map.

The gradient map generation unit 310 produces a gradient map and a shifted gradient map of the predicted block. A method of producing the gradient map is not limited, and would be obvious to those of ordinary skill in the technical field to which the present invention pertains. The gradient map may be produced by performing a sobel operation, which is an image processing method for edge detection, on the predicted block, as will now be described in detail with reference to FIGS. 4A to 4C.

Figure 4A:
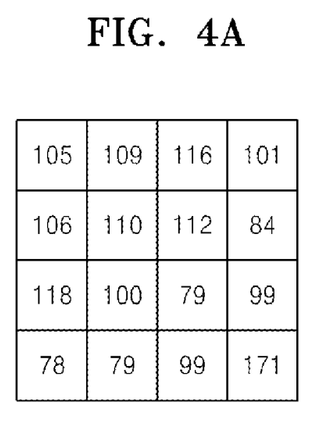
FIG. 4A illustrates a predicted block according to an exemplary embodiment of the present invention.
Figure 4B:
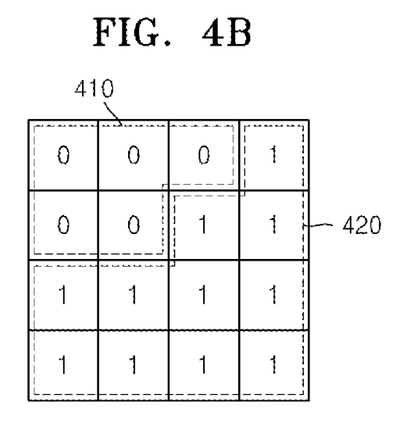
FIG. 4B illustrates a gradient map according to an exemplary embodiment of the present invention.
Figure 4C:
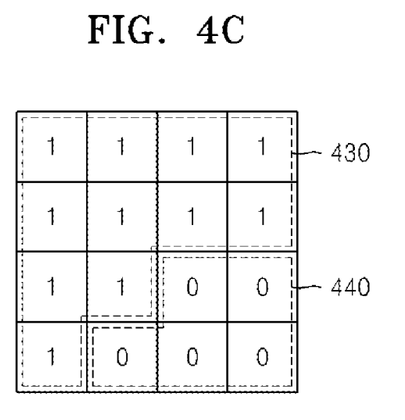
FIG. 4C illustrates a shifted gradient map according to an exemplary embodiment of the present invention.

FIGS. 4A through 4C respectively illustrate a predicted block, a gradient map, and a shifted gradient map, according to an exemplary embodiment of the present invention.

If a 4×4 block illustrated in FIG. 4A is the predicted block produced by the prediction unit 202, a gradient map of the 4×4 block is as illustrated in FIG. 4B. Referring to FIG. 4B, a pixel expressed with '0' is included in a plane region having no gradient, and a pixel expressed with '1' is included in a region having a gradient. In other words, in FIG. 4B, it is highly probable that a pixel included in the region expressed with '0' is included in a plane region of an image and a pixel included in a region expressed with '1' is included in an edge region or a texture region of the image.

Thus, the pixels in a region 410 having a gradient value of '0' are likely to be more precisely predicted than the pixels in a region 420 having a gradient value of '1'.

The gradient map generation unit 310 generating the gradient map illustrated in FIG. 4B produces the shifted gradient map illustrated in FIG. 4C by shifting the pixels in the region of the gradient map, which is expressed with '1'. That is, the shifted gradient map of FIG. 4C is produced by shifting the pixels expressed with '1' to the top of the residual block and then to the left side of the residual block.

Referring to FIG. 3, the selection unit 320 selects residual values on which DCT is to be performed from among the residual values of the residual block according to the gradient map of FIG. 4B. That is, in the gradient map of FIG. 4B, residual values of a region 520 of the residual block, which corresponds to the region that is very probably incorrectly predicted, i.e., the region 420 having the gradient value of '1', are selected as residual values on which DCT is to be performed.

Residual values that are highly, spatially correlated with each other, e.g., residual values in region 520, corresponding to region 420, having the gradient value of '1', are selected from the residual block as residual values on which DCT is to be performed, based on the predicted block.

Residual values in the other region 510 of the residual block, which have the gradient value of '0', correspond to a plane region of the predicted block, and thus the other region 510 is very likely to be precisely predicted. For this reason, DCT is not performed on the other region 510 of the residual block.

Figure 5A:
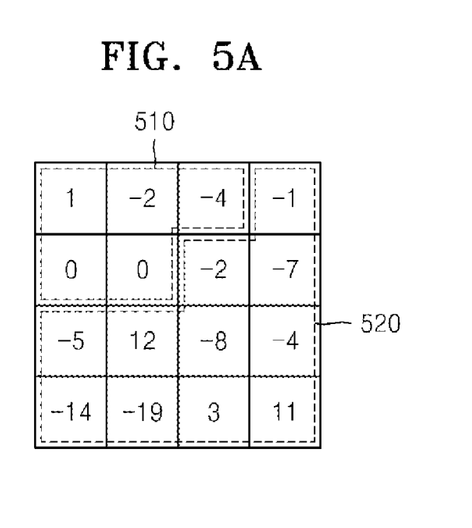
FIG. 5A illustrates a residual block according to an exemplary embodiment of the present invention.
Figure 5B:
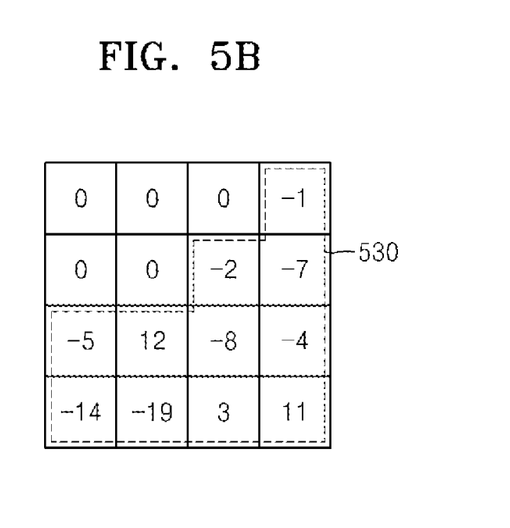
FIG. 5B illustrates a selected residual block according to an exemplary embodiment of the present invention.

As illustrated in FIG. 5B, a block on which DCT is to be performed, which is selected by the selection unit 320, does not include the residual values of the region 510 having the gradient value of '0'.

The shift unit 330 shifts the residual values of region 520 selected by the selection unit 320. That is, the residual values of region 520 selected based on the shifted gradient map illustrated in FIG. 4C are shifted to the top and the left side of the residual block. The reason for shifting the residual values of region 520 is to perform shape-adaptive DCT which will be described later.

Referring to FIG. 2, the pre-processor 208 transforms the residual block on which DCT is to be performed. Then, the transformation unit 210 partially performs DCT on the transformed residual block, based on the information for increasing the spatial correlation among the values of residuals of the residual block, which is generated by the pre-processor 208.

Figure 5C:
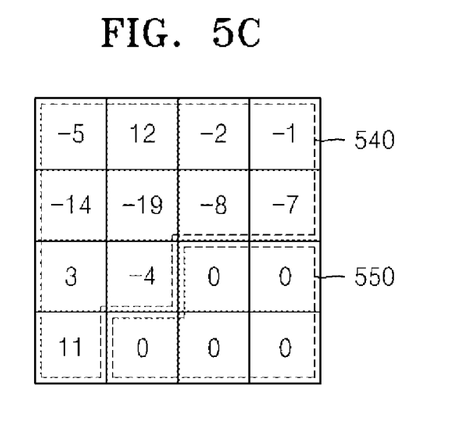
FIG. 5C illustrates a shifted residual block according to an exemplary embodiment of the present invention.

Shape-adaptive DCT is preferably performed on the block of FIG. 5C, which is obtained by shifting the selected residual values illustrated in FIG. 5B.

As illustrated in FIG. 5C, one-dimensional (1D) DCT is performed only on a region 540 having residual values other than '0' from among the shifted residual values, in a column direction. Then, 1D DCT is performed on DCT coefficients obtained by performing 1D DCT in a row direction. Alternatively, 1D DCT may be sequentially performed in the row direction and the column direction, rather than in the column direction and the row direction.

The quantization unit 212 quantizes the DCT coefficients obtained by performing DCT by the transformation unit 210. If the transformation unit 210 performs shape-adaptive DCT, DCT coefficients of only the region 540 illustrated in FIG. 5C which have residual values other than '0' are obtained. Accordingly, quantization is performed only on the DCT coefficients of the region 540.

Figure 6:
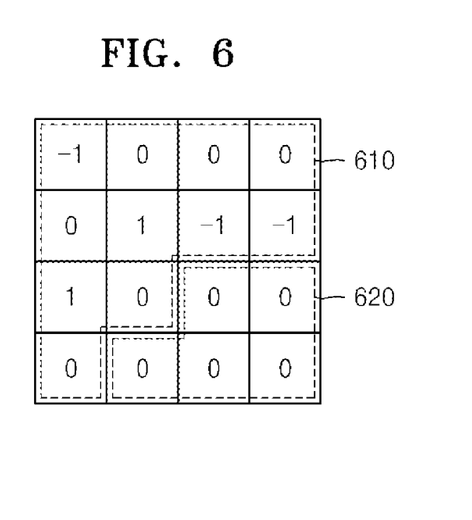
FIG. 6 illustrates quantized DCT coefficients according to an exemplary embodiment of the present invention.

FIG. 6 illustrates the result of quantizing DCT coefficients obtained by performing shape-adaptive DCT, according to an exemplary embodiment of the present invention. In detail, FIG. 6 illustrates the result of performing shape-adaptive DCT on the shifted residual values of FIG. 5C so as to obtain DCT coefficients, and of quantizing the DCT coefficients. The quantized DCT coefficients having values other than '0' are included in only a specific region 610, similar to the region 430 expressed with values of '1' of the shifted gradient map of FIG. 4C and the region 540 of FIG. 5C that is obtained by shifting the selected residual values.

Also, the quantized DCT coefficients of a region 620 that corresponds to the region 440 of FIG. 4C which is expressed with values of '0' and the region 550 of FIG. 5C which is expressed with values of '0', are all '0'.

Referring to FIG. 2, the entropy encoding unit 214 performs entropy encoding on the DCT coefficients quantized by the quantization unit 212.

According to the current exemplary embodiment of the present invention, the entropy encoding unit 214 performs entropy encoding based on the information, e.g., the gradient map, which is generated by the pre-processor 208. As described above with reference to FIG. 6, the region 440 having the gradient values of '0' of the shifted gradient map is identical to the region 620 having the quantized DCT coefficients of '0'. Thus, entropy encoding need not be performed on the region 620 having the DCT coefficients of '0'.

An entropy encoding unit of a related art encoding apparatus produces a significant map of the DCT coefficients quantized by the quantization unit 212, and respectively entropy encodes absolute values and signs of significant map values of '1', according to related art context models.

However, according to the current exemplary embodiment of the present invention, the entropy encoding unit 214 need not perform entropy encoding on the region 620 having the DCT coefficients of '0' since the region 620 has already been determined by the pre-processor 208. Thus, it is possible to increase the compression rate of encoding.

Similar to the pre-processor 208, the post-processor 216 produces information for increasing the correlation among the residual values of the residual block, based on the predicted block produced by the prediction unit 202. That is, a gradient map and a shifted gradient map of the predicted block are produced.

The inverse quantization unit 218 inversely quantizes the DCT coefficients quantized by the quantization unit 212.

The inverse transformation unit 220 performs inverse DCT on the inversely quantized DCT coefficients. Inverse DCT is partially performed only on coefficients, which are included in the specific region 610, from among the DCT coefficients, using the information produced by the post-processor 216, i.e., the shifted gradient map.

For example, shape-adaptive, inverse DCT may be performed on the DCT coefficients included in the specific region 610.

The addition unit 222 rearranges residual values obtained by performing inverse DCT, based on the information, e.g., the gradient map. That is, the residual values shifted according to the shifted gradient map are re-shifted so as to be rearranged according to the gradient map.

The rearranged residual values are added to the predicted block produced by the prediction unit 202, thereby restoring the current block. The restored block is deblocking filtered by the filter 224 and then stored in the frame memory 204 so that it can be used for prediction of a subsequent picture or a subsequent block.

Figure 7:
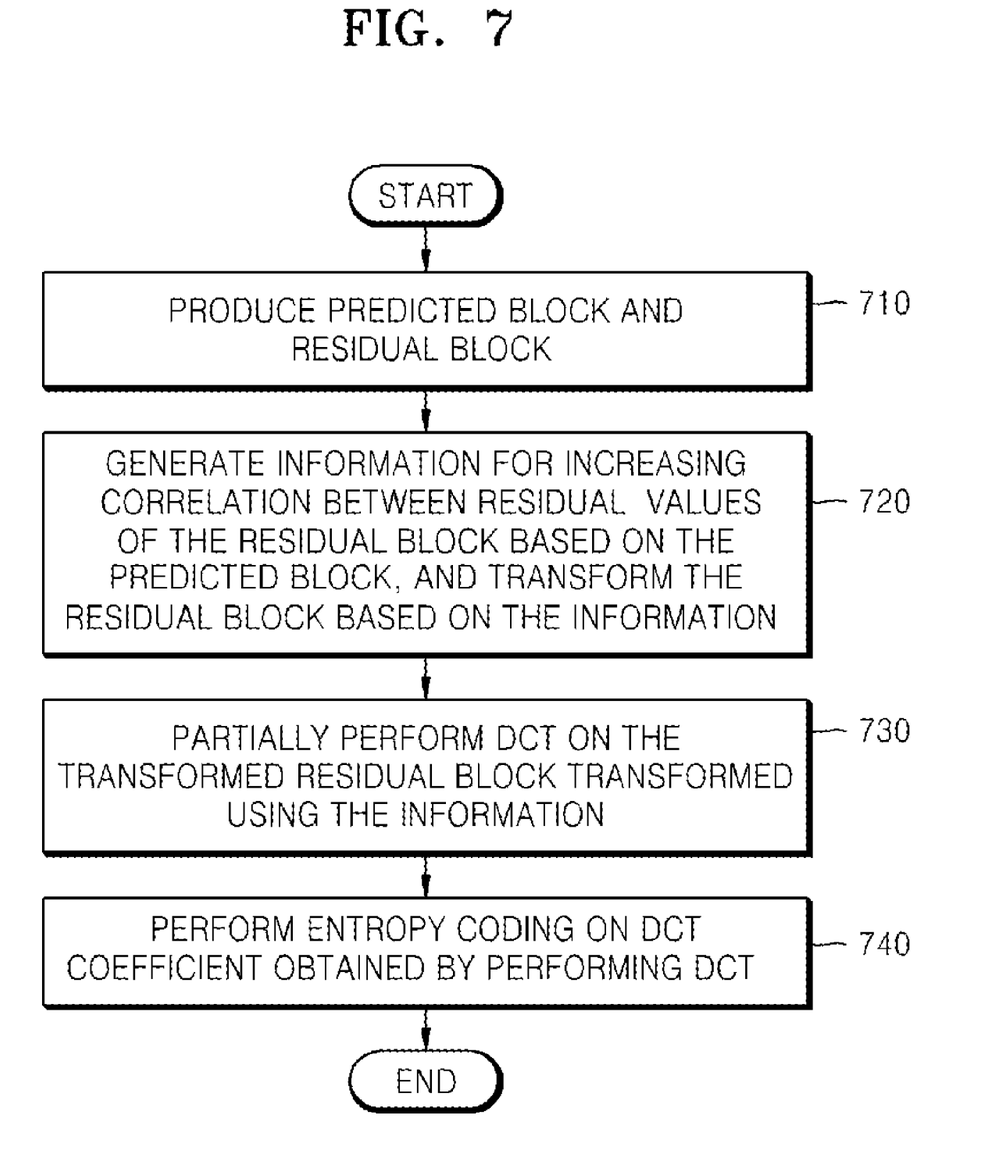
FIG. 7 is a flowchart illustrating a method of encoding an image, according to an exemplary embodiment of the present invention.

FIG. 7 is a flowchart illustrating a method of encoding an image, according to an exemplary embodiment of the present invention. Referring to FIG. 7, in operation 710, an image encoding apparatus according to an exemplary embodiment of the present invention produces a predicted block and a residual block of a current block. The predicted block is generated by performing inter prediction or intra prediction on the current block, and the residual block is generated by subtracting the predicted block from the current block.

In operation 720, the image encoding apparatus generates information for increasing the correlation among residual values of the residual block, based on the predicted block generated in operation 710. The information may be a gradient map and a shifted gradient map of the predicted block.

Then, the residual block is transformed based on the information. That is, in the gradient map, residual values of regions having the same gradient value are closely related to one another, and the residual block is transformed by shifting only these residual values.

In operation 730, the image encoding apparatus partially performs DCT on the residual block transformed using the information generated in operation 720. Shape-adaptive DCT may be performed on only the residual values that are closely related to one another.

In operation 740, the image encoding apparatus performs entropy encoding on DCT coefficients obtained by performing DCT in operation 730. That is, entropy encoding is performed on only the DCT coefficients included in the specific region 610, based on the shifted gradient map generated in operation 720.

The above image encoding method according to an exemplary embodiment of the present invention is used as one of a plurality of modes for image encoding. That is, the image encoding method is one of a plurality of encoding modes, which is selectively performed according to the result of calculating a rate-distortion (R-D) cost. If the R-D cost when only DCT, quantization, and entropy encoding are performed, as suggested in a related art method, is lower than when pre-processing is further performed to transform a residual block according to an exemplary embodiment of the present invention, then a current block is encoded according to the related art method.

Figure 8:
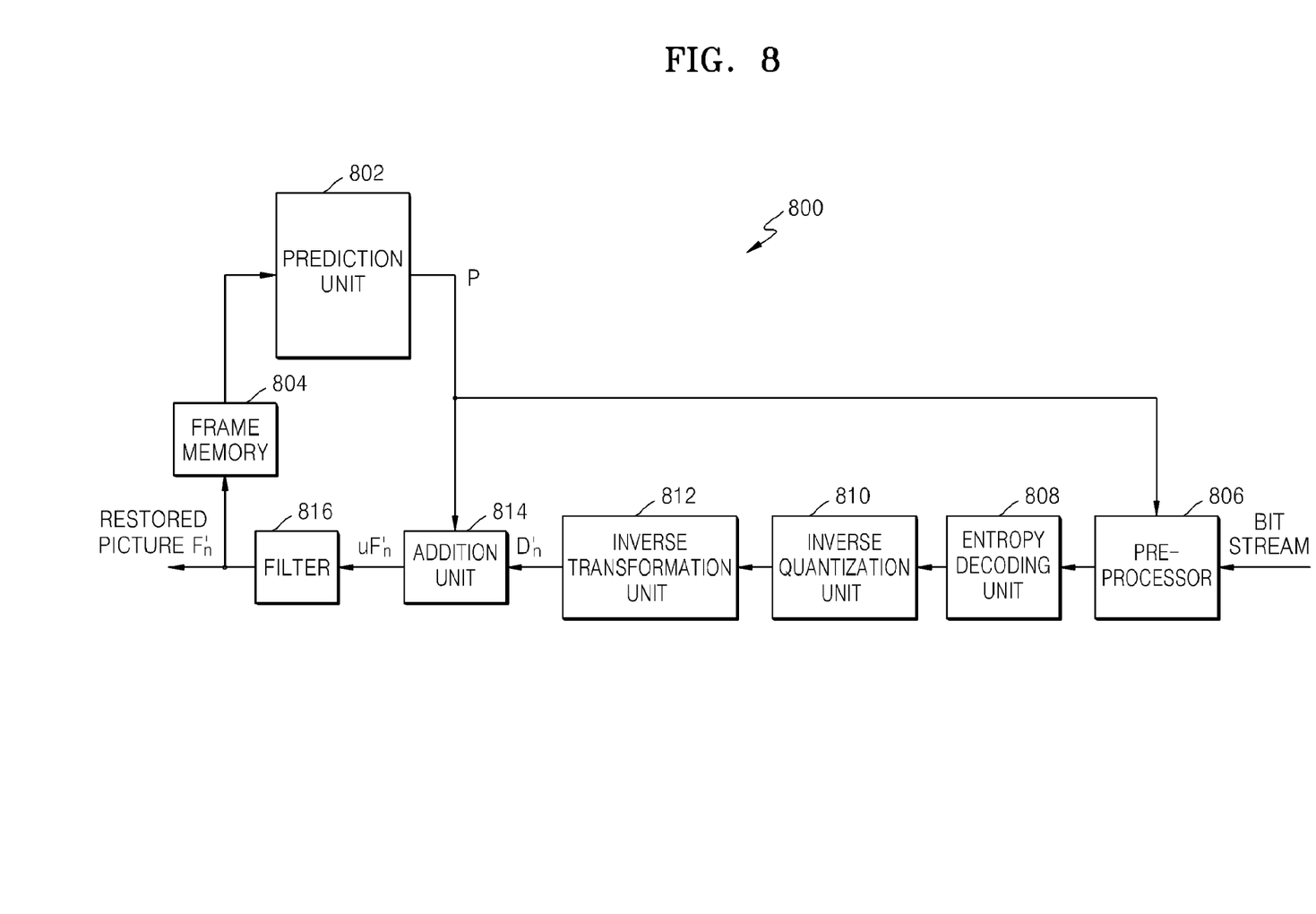
FIG. 8 is a block diagram of an apparatus for decoding an image, according to an exemplary embodiment of the present invention.

FIG. 8 is a block diagram of an image decoding apparatus 800 according to an exemplary embodiment of the present invention. Referring to FIG. 8, the decoding apparatus 800 includes a prediction unit 802, a frame memory 804, a pre-processor 806, an entropy decoding unit 808, an inverse quantization unit 810, an inverse transformation unit 812, an addition unit 814, and a filter 816. Here, the pre-processor 806, the entropy decoding unit 808, and the inverse transformation unit 812 correspond to an image decoding apparatus according to an exemplary embodiment of the present invention.

The prediction unit 802 generates a predicted block of a current block that is to be decoded by performing inter prediction or intra prediction. In this case, inter prediction or intra prediction is performed, using either a reference picture(s) stored in the frame memory 804 or pixels included in previously encoded blocks adjacent to the current block.

The pre-processor 806 produces information for increasing the spatial correlation among residual values of a residual block, based on the predicted block. The information may be a gradient map and a shifted gradient map of the predicted block. In the gradient map, residual values included in a region having similar gradient values are closely, spatially related to one another.

The entropy decoding unit 808 performs entropy decoding so as to generate DCT coefficients of the current block, using the information produced by the pre-processor 806, i.e., the gradient map and the shifted gradient map.

In an image encoding method according to an exemplary embodiment of the present invention, a shifted gradient map, such as that illustrated in FIG. 4C, of a predicted block is used to perform entropy encoding. Thus, the shifted gradient map of the predicted block generated by the prediction unit 802 is also used to perform entropy decoding for image decoding. Entropy decoding is not performed on the region 620 of FIG. 6, on which entropy encoding is not performed according to the shifted gradient map.

The inverse quantization unit 810 inversely quantizes DCT coefficients obtained as the result of the entropy decoding unit 808 performing entropy decoding.

The inverse transformation unit 812 performs inverse DCT on the inversely quantized DCT coefficients. Shape-adaptive, inverse DCT may be performed.

Inverse DCT is partially performed only on DCT coefficients included in the specific region 610 of FIG. 6, based on the shifted gradient map produced by the pre-processor 806.

1D inverse DCT is performed in a column direction. Then, 1D inverse DCT is performed on DCT coefficients obtained by performing 1D inverse DCT in a row direction. Alternatively, 1D inverse DCT may be performed in the row direction and then in the column direction.

The addition unit 814 rearranges residual values obtained by performing inverse DCT by the inverse transformation unit 812. The obtained residual values are shifted as illustrated in FIG. 5C. Thus, in order to restore the original residual block that has yet to be shifted as illustrated in FIG. 5B, the residual values are rearranged according to the gradient map produced by the pre-processor 806.

The rearranged residual block and the predicted block that is produced by the prediction unit 802 are combined so as to restore the current block. The restored block is deblocking filtered by the filter 816, and stored in the frame memory 804 so that it can be used for prediction of a subsequent picture or a subsequent block.

Figure 9:
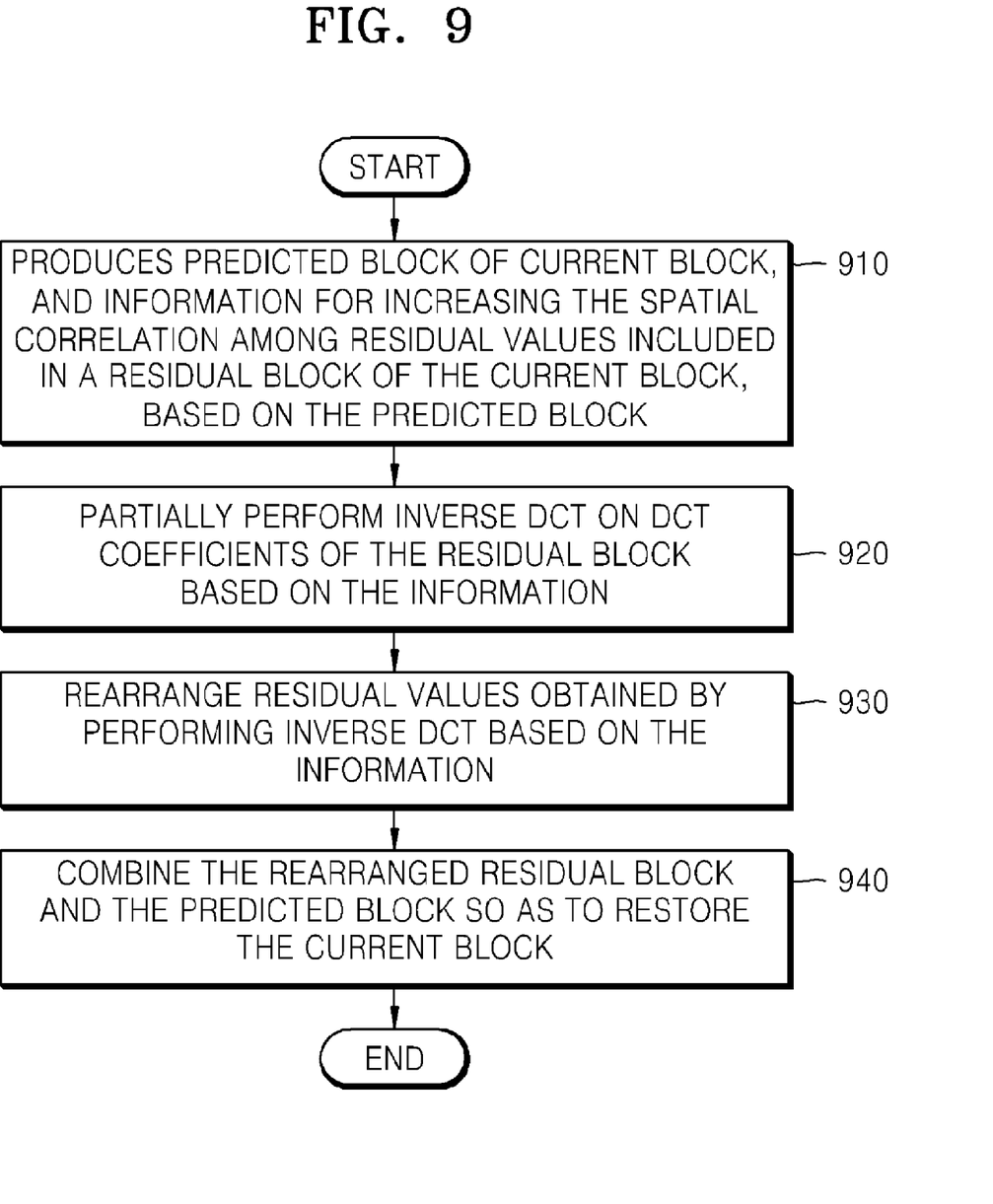
FIG. 9 is a flowchart illustrating a method of decoding an image, according to an exemplary embodiment of the present invention.

FIG. 9 is a flowchart illustrating a method 900 that decodes an image, according to an exemplary embodiment of the present invention. Referring to FIG. 9, in operation 910, an image decoding apparatus according to an exemplary embodiment of the present invention produces a predicted block of a current block, and produces information for increasing the spatial correlation among the values of residuals included in a residual block of the current block, based on the predicted block. The information may include a gradient map and a shifted gradient map of the predicted block.

In operation 920, the image decoding apparatus partially performs inverse DCT on DCT coefficients of the residual block, based on the information produced in operation 910. That is, shape-adaptive inverse DCT is performed on a part of the DCT coefficients according to the shifted gradient map produced in operation 910.

In operation 930, the image decoding apparatus rearranges residual values obtained by performing inverse DCT in operation 920, based on the information produced in operation 910. That is, the residual values are shifted so as to be rearranged according to the gradient map produced in operation 910.

In operation 940, the image decoding apparatus combines the rearranged residual block and the predicted block so as to restore the current block.

According to the present invention, information for increasing the spatial correlation among the values of residuals included in a residual block is created based on a predicted block, the residual block is transformed based on the information, DCT is partially performed on the transformed residual block, and the result of performing DCT is encoded, thereby improving the compression rate of encoding.

Also, entropy encoding is partially performed based on the information for increasing the spatial correlation. That is, entropy encoding is performed on only indispensable DCT coefficients, thus improving the compression rate of encoding.

The present invention can be embodied as computer readable code in a computer readable medium. Here, the computer readable medium may be any recording apparatus capable of storing data that is read by a computer system, e.g., a read-only memory (ROM), a random access memory (RAM), a compact disc (CD)-ROM, a magnetic tape, a floppy disk, an optical data storage device, and so on. The computer readable medium can be distributed among computer systems that are interconnected through a network, and the present invention may be stored and implemented as computer readable code in the distributed system.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A method of encoding an image, comprising:
    generating a predicted block of a current block, and subtracting the predicted block from the current block to generate a residual block of the current block;
    generating information for increasing a spatial correlation among residual values included in the residual block based on the predicted block, and transforming the residual block based on the information; and
    performing discrete cosine transformation (DCT) on a part of the transformed residual block based on the information,
    wherein the generating of the information comprises generating a gradient map of the predicted block.

2. The method of claim 1, wherein the performing of the DCT comprises performing shape-adaptive DCT on the transformed residual block.

3. The method of claim 1, wherein the generating of the information and transforming of the residual block comprises:
    selecting residual values on which the DCT is to be performed, from among the residual values of the residual block, based on the gradient map; and
    shifting the selected residual values to the top and the left side of the residual block.

4. The method of claim 3, wherein the performing of the DCT comprises performing shape-adaptive DCT on the shifted residual values.

5. The method of claim 4, further comprising performing entropy encoding only on coefficients obtained by the performing shape-adaptive DCT, according to the gradient map.

6. The method of claim 5, wherein the performing of entropy encoding comprises generating a significant map only of the coefficients obtained by the performing shape-adaptive DCT.

7. An apparatus for encoding an image, the apparatus comprising:
    a prediction unit which generates a predicted block of a current block;
    a subtraction unit which generates a residual block of the current block by subtracting the predicted block from the current block;
    a pre-processor which generates information for increasing the spatial correlation among values of residuals included in the residual block based on the predicted block, and transforming the residual block based on the information; and
    a transformation unit which performs discrete cosine transformation (DCT) on a part of the transformed residual block based on the information,
    wherein the pre-processor comprises a gradient map generation unit which generates a gradient map of the predicted block, and
    wherein at least one of the prediction unit, subtraction unit, pre-processor and the transformation unit is implemented as a hardware component.

8. The apparatus of claim 7, wherein the transformation unit performs shape-adaptive DCT on the transformed residual block.

9. The apparatus of claim 7, wherein the pre-processor comprises:
    a selection unit which selects residual values on which the DCT is to be performed, from among the residual values of the residual block, based on the gradient map; and
    a shift unit which shifts the selected residual values to the top and the left side of the residual block.

10. The apparatus of claim 9, wherein the transformation unit performs shape-adaptive DCT on the shifted residual values.

11. The apparatus of claim 9, further comprising an entropy encoding unit which performs entropy encoding on only coefficients obtained by performing shape-adaptive DCT, according to the gradient map.

12. The apparatus of claim 11, wherein the entropy encoding unit generates a significant map only of the coefficients obtained by the performing shape-adaptive DCT.

13. A method of decoding an image, the method comprising:
    generating a predicted block of a current block, and information for increasing the spatial correlation among residual values included in a residual block of the current block based on the predicted block;
    performing inverse discrete cosine transformation (DCT) on a part of DCT coefficients of the residual block, based on the information;
    rearranging the residual values of the residual block which are obtained by the performing inverse DCT, based on the information; and
    combining the rearranged residual block and the predicted block to restore the current block,
    wherein the generating of the predicted block and the information comprises generating a gradient map of the predicted block.

14. The method of claim 13, wherein the performing of inverse DCT comprises performing shape-adaptive inverse DCT on a part of the DCT coefficients of the residual block, based on the gradient map.

15. The method of claim 14, wherein the rearranging of the residual values comprises shifting residual values included in the residual block on which the shape-adaptive inverse DCT is performed based on the gradient map.

16. An apparatus for decoding an image, the apparatus comprising:
- a prediction unit which generates a predicted block of a current block;
- a pre-processor which generates information for increasing a spatial correlation among values of residuals included in a residual block of the current block, based on the predicted block;
- an inverse transformation unit which performs inverse discrete cosine transformation (DCT) on a part of DCT coefficients of the residual block, based on the information; and
- an addition unit which rearranges the residual values of the residual block which are obtained by performing inverse DCT based on the information, and combines the rearranged residual block and the predicted block to restore the current block,
- wherein the pre-processor generates a gradient map of the predicted block.

17. The apparatus of claim 16, wherein the inverse transformation unit performs shape-adaptive DCT on the DCT coefficients of the residual block based on the gradient map.

18. The apparatus of claim 17, wherein the addition unit shifts the residual values of the residual block on which the shape-adaptive inverse DCT is performed based on the gradient map, and combines the shifted residual values and the predicted block to restore the current block.

19. A non-transitory computer readable medium having recorded thereon a program for executing the method of claim 13.

* * * * *